Nov. 30, 1948.   A. HOYER   2,455,010
THERMOHYDROMETER
Filed Nov. 5, 1943
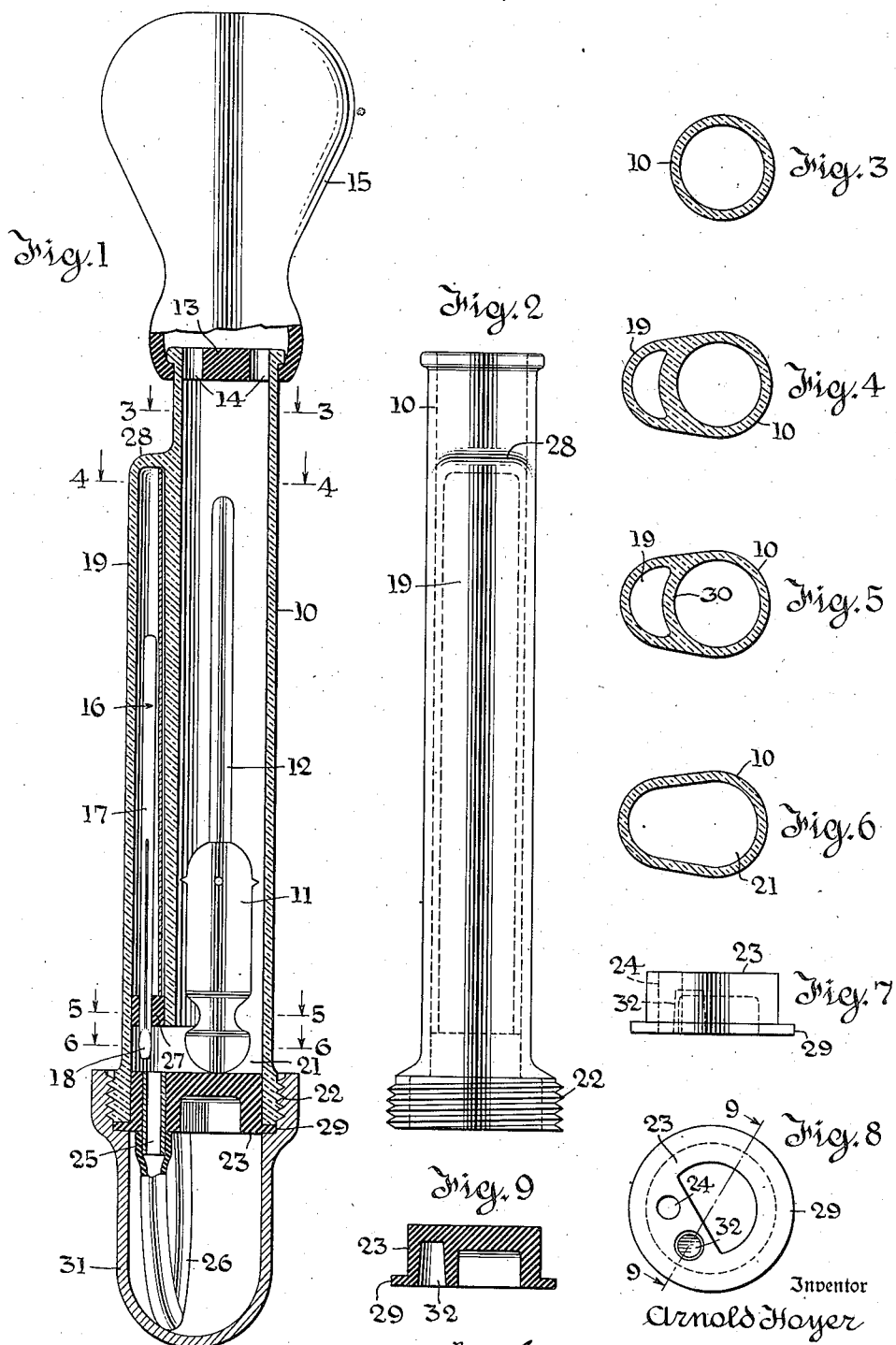
Inventor
Arnold Hoyer
By George A. Degnan
Attorney Patented Nov. 30, 1948

2,455,010

UNITED STATES PATENT OFFICE 2,455,010

THERMOHYDROMETER

Arnold Hoyer, Conshohocken, Pa., assignor, by mesne assignments, to Owens-Illinois Glass Company, Toledo, Ohio, a corporation of Ohio Application November 5, 1943, Serial No. 509,112

1 Claim. (Cl. 73—34)

The present invention relates to thermohydrometers, and more particularly a combined barrel and thermometer housing. It is desirable in hydrometers having thermometers associated therewith so to mount the thermometer that the temperature indicating portion thereof be protected by a surrounding housing, but sealed from the barrel to prevent passage of the solution being tested into the housing. One type of apparatus employs a transparent thermometer housing attached to a transparent float barrel for this purpose. In the present invention the two transparent members are combined in a molded integral body, thus eliminating several parts and reducing the cost of manufacture.

It is one of the objects of the invention to provide a combined float barrel and thermometer housing formed into an integral body having a common dividing wall separating the barrel from the housing.

It is another object of the invention to provide a novel nozzle carrying closure for the float barrel.

Other objects will be apparent from the following description of the invention, reference being had therein to the acompanying drawings, in which Fig. 1 is a front elevation, partly in section, of one embodiment of the invention;

Fig. 2 is a side elevation of the combined barrel and thermometer housing;

Fig. 3 is a transverse section taken on line 3—3 of Fig. 1;

Fig. 4 is a transverse section taken on line 4—4 of Fig. 1;

Fig. 5 is a transverse section taken on line 5—5 of Fig. 1;

Fig. 6 is a transverse section taken on line 6—6 of Fig. 1;

Fig. 7 is an elevation of the plug employed to close the lower end of the barrel;

Fig. 8 is a bottom view of the plug shown in Fig. 7; and

Fig. 9 is a section taken on line 9—9 of Fig. 8.

In the drawing, the hydrometer barrel is shown at 10 and is adapted to house the conventional float 11 having a graduated indicating stem 12 thereon. The upper end of the barrel is partially closed by a stopper 13 having apertures 14 therein communicating with suction bulb 15. A thermometer 16 having a graduated indicating portion 17 and bulb portion 18 is mounted in an elongated hollow lateral housing 19 formed integral with the barrel. Housing 19 and barrel 10 merge into a cylindrical chamber 21 constituting the lower end of the combined barrel and thermometer housing and having an open end. The interior of chamber 21 is preferably smooth, while the exterior thereof is threaded adjacent its end as shown at 22 for a purpose to be later described. The cylindrical chamber accommodates a tight-fitting plug 23 closing the open end of the chamber and being apertured at 24 to receive a short length of tubing 25 to which a rubber nozzle hose 26 is attached.

In the drawing it will be seen that barrel 10 and housing 19 have an impervious common wall 30 terminating some distance above the cylindrical chamber 21. The housing is closed at the terminal edge of the common dividing wall by a rubber plug 27 having an opening through which the bulb of the thermometer extends into the chamber therebelow, the thermometer fitting tightly in the plug opening so that the indicating portion thereof is sealed against liquid in the barrel. The housing is closed at its upper end by a bridge wall 28 formed integral with the barrel.

Plug 23 is provided with an annular flange 29 overlying the bottom edge of chamber 21 and forming a seal therewith when the threaded cover cap 31 is placed on the lower end of the hydrometer. Hose 26 is adapted to be bent upwardly with its end placed in recess 32 in the plug when the protective cover is in place. The hose is thus folded neatly when not in use and is protected against injury by cap 31.

From the foregoing description it will be seen that there is combined in a single molded body a combined barrel and thermometer housing with a common dividing wall. The housing is arranged to be sealed with respect to the barrel to prevent liquid from passing into the housing and around the indicating portion of the thermometer. There is also provided a novel sealing plug for the barrel, the plug having means for carrying a nozzle hose and being adapted to hold the hose in a compact folded position when the hydrometer is not in use.

While a preferred form of the invention has been illustrated it is to be understood that it is susceptible to such modifications as fall within the meaning of the claim appended hereto. The body comprising the combined barrel and housing has been described as transparent and it is intended that the material from which it is formed be one of the plastics suitable for this purpose, or it may be glass or some other similar material.

Having described my invention, what I claim as new and desire to secure by Letters Patent is:

In a thermohydrometer, a molded body comprising a barrel and a thermometer housing, said barrel being disposed exteriorly of and parallel with respect to said housing, said barrel and said housing merging into a terminal cylindrical chamber having an open end, said barrel, housing and chamber forming an integral structure, said body having an impervious wall common to and separating said barrel from said housing, said wall terminating in spaced relation to said chamber, a float in said barrel, a thermometer, that end of said housing merging into said chamber having means supporting said thermometer with the indicating portion thereof in said housing and the bulb portion thereof in said chamber, said supporting means sealing said housing from said chamber, the other end of said housing merging into said barrel to form a closed end for said housing, an apertured plug closing the open end of said cylindrical chamber, said plug having an annular flange overlying the edge of said chamber end, and a flexible hose connected to said plug aperture, said plug having a recess adapted to accommodate the free end of said hose to hold the hose in bent position.

ARNOLD HOYER.

REFERENCES CITED

The following references are of record in the file of this patent:

UNITED STATES PATENTS

| Number | Name | Date |
| --- | --- | --- |
| Re. 2,347 | Bee | Sept. 4, 1866 |
| 1,362,053 | Steiner | Dec. 14, 1920 |
| 1,537,888 | Schwidetzky | May 12, 1925 |
| 1,767,355 | Edelmann | June 24, 1930 |
| 1,923,192 | Edelmann | Aug. 22, 1933 |
| 1,965,456 | Edelmann | July 3, 1934 |
| 2,016,830 | Edelmann | Oct. 8, 1935 |
| 2,043,405 | Edelmann | June 9, 1936 |
| 2,180,248 | Layne | Nov. 14, 1939 |

FOREIGN PATENTS

| Number | Country | Date |
| --- | --- | --- |
| 693,827 | France | Sept. 2, 1930 |
| 850,370 | France | Sept. 11, 1939 |